United States Patent
Lin et al.

(10) Patent No.: US 11,600,069 B2
(45) Date of Patent: Mar. 7, 2023

(54) METHOD AND APPARATUS FOR DETECTING TEMPORAL ACTION OF VIDEO, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Tianwei Lin, Beijing (CN); Xin Li, Beijing (CN); Dongliang He, Beijing (CN); Fu Li, Beijing (CN); Hao Sun, Beijing (CN); Shilei Wen, Beijing (CN); Errui Ding, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 184 days.

(21) Appl. No.: 17/144,205

(22) Filed: Jan. 8, 2021

(65) Prior Publication Data
US 2021/0216782 A1     Jul. 15, 2021

(30) Foreign Application Priority Data
Jan. 10, 2020 (CN) .......................... 202010026653.2

(51) Int. Cl.
*G06K 9/00* (2022.01)
*G06K 9/62* (2022.01)
*G06V 20/40* (2022.01)

(52) U.S. Cl.
CPC ........... *G06V 20/46* (2022.01); *G06K 9/6256* (2013.01); *G06V 20/49* (2022.01); *G06V 20/44* (2022.01)

(58) Field of Classification Search
CPC ............... G06K 9/6256; G06K 9/6262; G06K 2009/00738; G06K 9/00302;
(Continued)

(56) References Cited

U.S. PATENT DOCUMENTS

| 10,057,651 B1* | 8/2018 | Singh .................. H04N 21/4394 |
| 2012/0210231 A1 | 8/2012 | Ubillos et al. |
| 2019/0138798 A1 | 5/2019 | Tang et al. |

FOREIGN PATENT DOCUMENTS

| CN | 103279759 A | 9/2013 |
| CN | 106446847 A | 2/2017 |

(Continued)

OTHER PUBLICATIONS

Tube Convolutional Neural Network (T-CNN) for Action Detection in Videos Rui Hou, Chen Chen, Mubarak Shah; Proceedings of the IEEE International Conference on Computer Vision (ICCV), 2017, pp. 5822-5831 (Year: 2017).*

(Continued)

*Primary Examiner* — Michael J Vanchy, Jr.
(74) *Attorney, Agent, or Firm* — Brooks Kushman P.C.

(57) ABSTRACT

A method and apparatus for detecting a temporal action of a video, an electronic device and a storage medium are disclosed, which relates to the field of video processing technologies. An implementation includes: acquiring an initial temporal feature sequence of a video to be detected; acquiring, by a pre-trained video-temporal-action detecting module, implicit features and explicit features of a plurality of configured temporal anchor boxes based on the initial temporal feature sequence; and acquiring, by the video-temporal-action detecting module, the starting position and the ending position of a video clip containing a specified action, the category of the specified action and the probability that the specified action belongs to the category from the plural temporal anchor boxes according to the explicit features and the implicit features of the plural temporal anchor boxes.

6 Claims, 4 Drawing Sheets

(58) Field of Classification Search
CPC .......... G06K 9/00362; G06K 9/00718; G06K 9/00751; G06K 9/00758; G06K 9/00765; G06K 9/4647; G06K 9/6215; G06V 10/764; G06V 20/44; G06V 20/46; G06V 20/49; G06V 10/82; G06V 40/20; G06V 10/454; G06V 10/25; G06V 20/41; G06V 20/47; G06T 2207/10016; G06T 2207/20016; G06T 2207/20076; G06T 2207/20084; G06T 7/277; G06T 7/74; G06T 7/194; G06N 3/0454; G06N 3/0481; G06N 3/08; G06F 16/739; G06F 3/04842; H04N 21/23418; H04N 21/44008; H04N 21/8549
See application file for complete search history.

(56) References Cited

FOREIGN PATENT DOCUMENTS

| CN | 108399380 A | 8/2018 |
|---|---|---|
| CN | 110401873 A | 11/2019 |
| CN | 110659572 A | 1/2020 |
| GB | 2560387 | 9/2018 |
| GN | 109271876 A | 1/2019 |
| GN | 109740499 A | 5/2019 |
| GN | 110263650 A | 9/2019 |
| JP | 10187759 A | 7/1998 |
| JP | 2018124972 A | 8/2018 |

OTHER PUBLICATIONS

Extended European Search Report of European application No. 21150522.7 dated Jun. 10, 2021, 9 pages.

Hou et al., "Tube Convolutional Neural Network (T-CNN) for Action Detection in Videos", Aug. 2, 2017, XP055543546, DOI:10.1109/ICCV.2017.620, retrieved from the internet: URL:https://arxiv.org/pdf/1703.10664.pdf [retrieved on Jan. 17, 2019], pp. 1-8.

Hou et al., "An End-to-end 3D Convolutional Neural Network for Action Detection and Segmentation in Videos", arxiv.org, Cornell University Library, 201 Olin Library Cornell University Ithaca, NY 14853, Nov. 30, 2017, XP081298915, pp. 1-9.

Hou et al., Tube Conventional Neural Network (T-CNN) for Action Detection in Videos, 2017 IEEE International Conference on Computer Vision (ICCV), 2017, 5823-5832.

* cited by examiner

METHOD AND APPARATUS FOR DETECTING TEMPORAL ACTION OF VIDEO, ELECTRONIC DEVICE AND STORAGE MEDIUM

CROSS-REFERENCE TO RELATED APPLICATIONS

The present application claims the priority of Chinese Patent Application No. 202010026653.2, filed on Jan. 10, 2020, with the title of "Method and Apparatus for Detecting Temporal Action of Video, Electronic Device and Storage Medium." The disclosure of the above application is incorporated herein by reference in its entirety.

TECHNICAL FIELD

The present application relates to the technical field of computers, and particularly relates to the field of video processing technologies, and particularly to a method and apparatus for detecting a temporal action of a video, an electronic device and a storage medium.

BACKGROUND

To produce short video content with high quality, a video producer is usually required to manually clip an interesting video clip from original long video material to remove a large amount of useless material, which requires much effort of the video producer. For example, to improve the video clipping efficiency, technical means are usually required to assist the video producer or a video platform in automatically clipping a short video clip of a specified action category from a long video. A related algorithm task in the clipping process is a task for detecting a temporal action of a video and aims at detecting the starting time, the ending time, the confidence score and the action category of a temporal action clip in the unclipped long video. This technology is a key technology for intelligently clipping a wonderful video.

An existing method for detecting a temporal action of a video is similar to a target detection task in a temporal dimension, may usually include temporal proposal generation and temporal proposal classification, and specifically includes: generating a temporal proposal with a sliding-window or temporal-proposal generating algorithm, and then classifying an action of the temporal proposal by a classification network.

However, the above-mentioned existing solution for detecting a temporal action of a video has a complicated implementation process, resulting in low temporal-action detection efficiency.

SUMMARY

In order to solve the above-mentioned technical problems, the present application provides a method and apparatus for detecting a temporal action of a video, an electronic device and a storage medium, so as to improve the accuracy of detection of the temporal action in the video.

In one aspect, the present application provides a method for detecting a temporal action of a video, including: acquiring an initial temporal feature sequence of a video to be detected; acquiring, by a pre-trained video-temporal-action detecting module, implicit features and explicit features of a plurality of configured temporal anchor boxes based on the initial temporal feature sequence; and acquiring, by the video-temporal-action detecting module, the starting position and the ending position of a video clip containing a specified action, the category of the specified action and the probability that the specified action belongs to the category from the plural temporal anchor boxes according to the explicit features and the implicit features of the plural temporal anchor boxes.

Further optionally, in the method as mentioned above, the acquiring an initial temporal feature sequence of a video to be detected includes: successively extracting a plurality of images from the video to be detected in an extraction order from front to back at a preset sampling period, so as to form an image sequence: and extracting a feature of each image in the image sequence, and splicing the features into the initial temporal feature sequence in the order in the image sequence.

Further optionally, in the method as mentioned above, the acquiring, by a pre-trained video-temporal-action detecting module, implicit features of a plurality of configured temporal anchor boxes based on the initial temporal feature sequence includes:

reducing, by the video-temporal-action detecting module, the temporal length of the initial temporal feature sequence according to a plurality of preset temporal length reduction ways, so as to obtain a plurality of adjusted reference temporal feature sequences; configuring a plurality of temporal anchor boxes with a preset number and different scales for temporal positions of each reference temporal feature sequence; and configuring the implicit feature of each temporal anchor box as the feature of the corresponding temporal position in the corresponding reference temporal feature sequence.

Further optionally, in the method as mentioned above, the acquiring, by a pre-trained video-temporal-action detecting module, explicit features of a plurality of configured temporal anchor boxes based on the initial temporal feature sequence includes: taking the reference temporal feature sequence with the longest length in the plural reference temporal feature sequences as a sample, and acquiring the explicit feature of each temporal anchor box by multiplying the sample by a sampling feature constructed for each temporal anchor box.

Further optionally, in the method as mentioned above, the acquiring, by the video-temporal-action detecting module, the starting position and the ending position of a video clip containing a specified action, the category of the specified action and the probability that the specified action belongs to the category from the plural temporal anchor boxes according to the explicit features and the implicit features of the plural temporal anchor boxes includes: splicing, by the video-temporal-action detecting module, the explicit feature and the implicit feature of each temporal anchor box to obtain a comprehensive feature of each temporal anchor box; detecting each temporal anchor box based on the comprehensive feature thereof, and screening a target temporal anchor box containing the specified action, the category of the specified action and the probability that the specified action belongs to the category; and detecting boundaries of the target temporal anchor box containing the specified action in the initial temporal feature sequence, and acquiring the starting position and the ending position of the video clip corresponding to the target temporal anchor box.

Further optionally, after the detecting boundaries of the target temporal anchor box containing the specified action in the initial temporal feature sequence, and before the acquiring the starting position and the ending position of the video clip corresponding to the target temporal anchor box, the method as mentioned above further includes: performing logistic regression analysis on the starting position and the ending position of the video clip corresponding to the target temporal anchor box in conjunction with a plurality of temporal features in the initial temporal feature sequence in front of and behind the boundaries of the target temporal anchor box.

In another aspect, the present application further provides an electronic device, including: at least one processor; and a memory communicatively connected with the at least one processor: wherein the memory stores instructions executable by the at least one processor, and the instructions are executed by the at least one processor to enable the at least one processor to perform a method for training models in machine translation, wherein the method includes acquiring an initial temporal feature sequence of a video to be detected; acquiring, by a pre-trained video-temporal-action detecting module, implicit features and explicit features of a plurality of configured temporal anchor boxes based on the initial temporal feature sequence; and acquiring, by the video-temporal-action detecting module, the starting position and the ending position of a video clip containing a specified action, the category of the specified action and the probability that the specified action belongs to the category from the plural temporal anchor boxes according to the explicit features and the implicit features of the plural temporal anchor boxes.

In still another aspect, the present application further provides a non-transitory computer readable storage medium with computer instructions stored thereon, wherein the computer instructions are used for causing a computer to perform a method for detecting a temporal action of a video, including acquiring an initial temporal feature sequence of a video to be detected; acquiring, by a pre-trained video-temporal-action detecting module, implicit features and explicit features of a plurality of configured temporal anchor boxes based on the initial temporal feature sequence; and acquiring, by the video-temporal-action detecting module, the starting position and the ending position of a video clip containing a specified action, the category of the specified action and the probability that the specified action belongs to the category from the plural temporal anchor boxes according to the explicit features and the implicit features of the plural temporal anchor boxes.

One embodiment in the above-mentioned application has the following advantages or beneficial effects. The temporal action of the video is detected with the pre-trained video-temporal-action detecting module, thus avoiding the detection process being divided into two steps of temporal proposal generation and temporal proposal classification in the prior art, with a simple implementation process and an effective improvement of the detection efficiency of the temporal action of the video.

Moreover, in the present application, the explicit features of the temporal anchor boxes are configured efficiently and accurately, and the temporal action is detected by combining the explicit feature and the implicit feature of each temporal anchor box, thus further improving the detection accuracy of the temporal action.

Other effects of the above-mentioned alternatives will be described below in conjunction with embodiments.

BRIEF DESCRIPTION OF THE DRAWINGS

The drawings are used for better understanding the present solution and do not constitute a limitation of the present application. In the drawings.

DETAILED DESCRIPTION

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Figure 1:
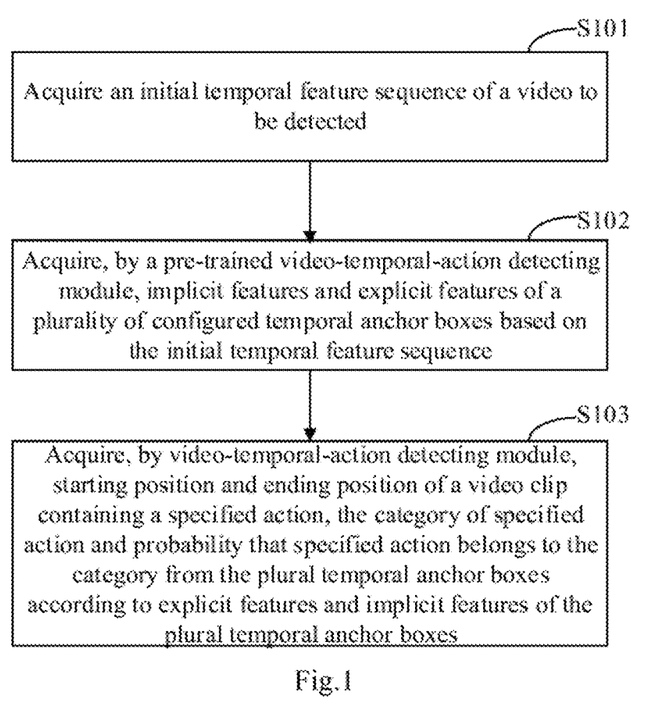
FIG. 1 is a schematic diagram according to a first embodiment of the present application.

FIG. 1 shows a flow chart of a method for detecting a temporal action of a video according to a first embodiment of the present application. As shown in FIG. 1, the method for detecting a temporal action of a video according to this embodiment may include the following steps:

S101, acquiring an initial temporal feature sequence of a video to be detected.

An apparatus for detecting a temporal action of a video serves as the execution subject of the method for detecting a temporal action of a video according to this embodiment, and may be configured as an electronic entity or implemented using a software-integrated application system. In use, the video to be detected is input into the apparatus for detecting a temporal action of a video, so as to acquire information, such as the starting position, the ending position, the action category, the probability of belonging to the action category of a video clip containing a specified action in the video, or the like.

For example, the step S101 of acquiring an initial temporal feature sequence of a video to be detected may include the following steps:

(a1) successively extracting a plurality of images from the video to be detected in an extraction order from front to back at a preset sampling period, so as to form an image sequence.

For example, the sampling period of the images in this embodiment may be one frame, two frames, five frames, or other number of frames.

(b1) extracting a feature of each image in the image sequence, and splicing the features into the initial temporal feature sequence in the order in the image sequence.

In this embodiment, the features of the images may be extracted with a convolutional neural network model for image classification, which may be pre-trained on an imagenet data set, and have a network structure similar to resnet 50. Specifically, results of the penultimate layer of the network may be adopted as the features of the input images. Alternatively, in practical applications, the features of the images may be extracted with other trained image-feature extracting models constructed by a convolutional neural network. Alternatively, other image-feature extracting methods may also be adopted, and are not repeated herein.

Optionally, in practical applications, the above-mentioned step S101 may be implemented in a video-temporal-action detecting module.

S102, acquiring, by a pre-trained video-temporal-action detecting module, implicit features and explicit features of a plurality of configured temporal anchor boxes based on the initial temporal feature sequence.

The video-temporal-action detecting module in this embodiment is configured as a pre-trained neutral network model. In use, the initial temporal feature sequence of the video to be detected is input into the video-temporal-action detecting module which may be divided into several blocks, such as a feature acquiring unit, an action classifier, a boundary regressor, or the like.

Specifically, the implicit features and the explicit features of the plural temporal anchor boxes may be acquired in the feature acquiring unit based on the initial temporal feature sequence. For example, the acquisition of the implicit features may include the following steps:

(a2) reducing, by the video-temporal-action detecting module, the temporal length of the initial temporal feature sequence according to a plurality of preset temporal length reduction ways, so as to obtain a plurality of adjusted reference temporal feature sequences.

For example, the initial temporal feature sequence has a length T, and four reference temporal feature sequences with different temporal lengths T/4, T/8, T/16 and T/32 may be acquired in a preset way respectively. The initial temporal feature sequence and the various reference temporal feature sequences correspond to video clips with the same time length, and are different in the interval between temporal positions corresponding to two adjacent temporal features.

(b2) configuring a plurality of temporal anchor boxes with a preset number and different scales for the temporal positions of each reference temporal feature sequence.

Each temporal anchor box in this embodiment corresponds to feature information within a duration range. With the configuration mode in this embodiment, the temporal anchor boxes may be configured on different scales on the temporal feature sequences with different time length granularities to correspondingly acquire as many video clips of the video to be detected as possible, so as to subsequently detect the video clip containing the specified action.

(c2) configuring the implicit feature of each temporal anchor box as the feature of the corresponding temporal position in the corresponding reference temporal feature sequence.

Figure 2:
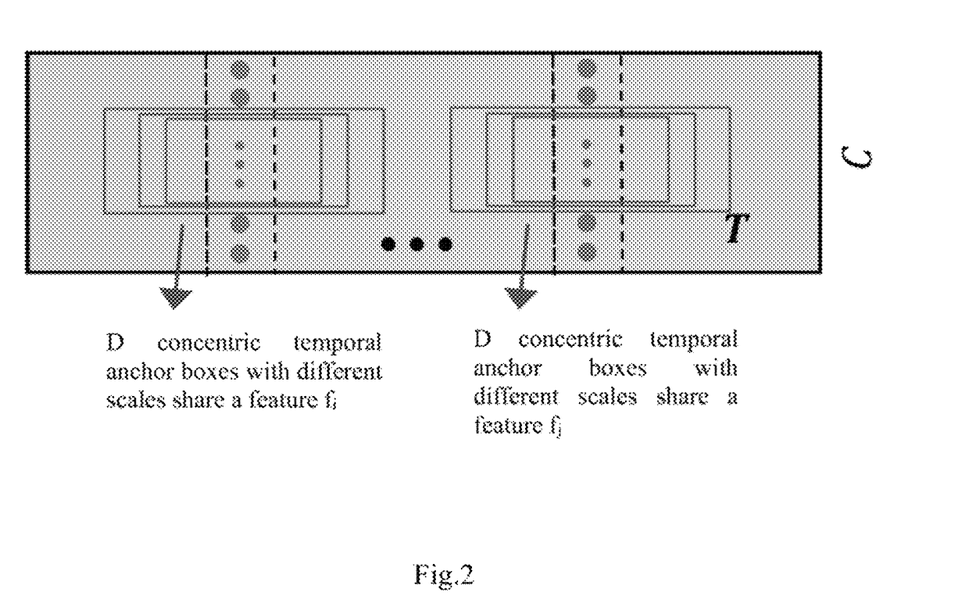
FIG. 2 is a schematic diagram of temporal anchor boxes with different scales according to the present application.

For example, FIG. 2 is a schematic diagram of the temporal anchor boxes with different scales according to the present application. As shown in FIG. 2, for example, D concentric temporal anchor boxes with different scales are configured for each temporal position, D being equal to 3 in FIG. 2. The D concentric temporal anchor boxes with different scales share the feature of the corresponding temporal position. If the temporal feature sequence with the length T has a size T×C, C being the number of channels of the feature, the feature of the t-th temporal position has a size 1×C.

Different reference temporal feature sequences have different lengths and correspond to different numbers of temporal anchor boxes. However, the corresponding implicit features of the temporal anchor boxes have the same size.

For example, as shown in FIG. 2, the $t_i$th temporal position in the temporal feature sequence $F \in R^{T \times C}$ with the length T may have a feature $f_i \in R^C$ and has a center point at the position $(t_i+0.5)/T$ after normalization, and two adjacent temporal features have an interval 1/T. During the acquisition of the implicit features, D temporal anchor boxes are associated with the $t_i$th temporal position in a certain temporal feature sequence, the center of the temporal position serves as the center of each temporal anchor box, and the length of each temporal anchor box is a multiple of the temporal interval 1/T, such as {0.5, 0.75, 1.0, 1.25, 1.5}. It is observed that the D temporal anchor boxes correspond to the same feature. In the present application, different temporal anchor boxes may be differently predicted through a network learning process, i.e., a network model training process, and therefore, the feature association process here may be called as an implicit feature sampling process; that is, the temporal anchor boxes and the temporal features have implicit corresponding relationships, and only the features of the center positions of the temporal anchor boxes with corresponding scales are taken. The implicit feature of one temporal anchor box $\varphi_i=[t_s, t_e]$ may be denoted as $m_i^I \in R^C$ in use.

Further, the acquiring, by a pre-trained video-temporal-action detecting module, explicit features of a plurality of temporal anchor boxes based on the initial temporal feature sequence may include: taking the reference temporal feature sequence with the longest length in the plural reference temporal feature sequences as a sample, and acquiring the explicit feature of each temporal anchor box by multiplying the sample by a sampling feature constructed for each temporal anchor box. Specifically, this step is also executed by the feature acquiring unit in the video-temporal-action detecting module.

Figure 3:
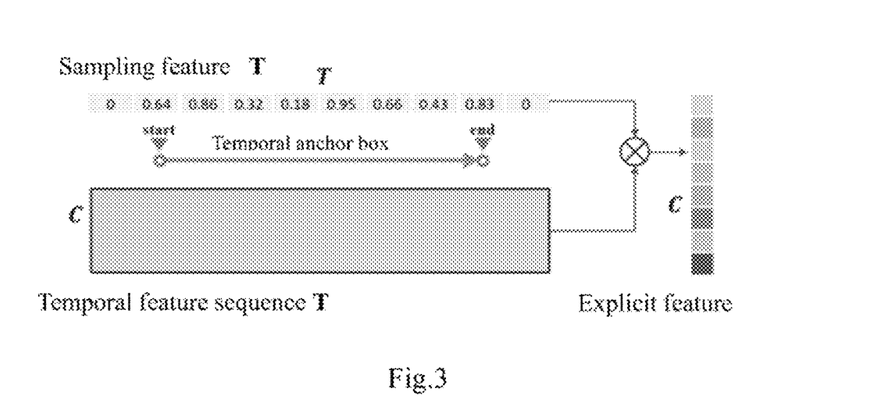
FIG. 3 is a schematic diagram of acquisition of explicit features of the temporal anchor boxes according to the present application.

For example, FIG. 3 is a schematic diagram of the acquisition of the explicit features of the temporal anchor boxes according to the present application. As shown in FIG. 3, for one temporal feature sequence $F \in R^{T \times C}$ with the length T and one preset temporal anchor box $\varphi_i=[t_s,t_e]$, a temporal range of the temporal anchor box is first expanded to $[t_s-0.5d, t_e+0.5d]$ with $d=t_e-t_s$ here. Then, one sampling feature is constructed for each temporal anchor box, specifically in the form of a vector, which may also be referred to as a learnable sampling vector represented as $s_i \in R^T$; optimal feature representation corresponding to each temporal anchor box may be adjusted and learned in the model training process. As shown in FIG. 3, all values within the temporal range of the temporal anchor boxes are set to random numbers within (0, 1] and may be optimized by gradient descent, and values outside the temporal range are 0 and unable to be optimized. One explicit feature of the temporal anchor box $\varphi_i$ is obtained and may be represented as $s_i \in R^T$, and by performing dot multiplication on the sampling feature and the temporal feature sequence F in the temporal dimension, an explicit sampled feature may be obtained and denoted as $m_i^E \in R^C$.

It should be noted that in order to guarantee the accuracy of the sampled features, for the temporal anchor boxes associated with the temporal feature sequences with different scales, an explicit-feature sampling module performs the sampling process from the temporal feature sequence with the highest resolution, i.e., the longest temporal length.

S103, acquiring, by the video-temporal-action detecting module, the starting position and the ending position of a video clip containing a specified action, the category of the specified action and the probability that the specified action belongs to the category from the plural temporal anchor boxes according to the explicit features and the implicit features of the plural temporal anchor boxes.

For example, this step may be implemented by the action classifier and the boundary regressor in the video-temporal-action detecting module, and for example, may include the following steps:

(a3) splicing, by the video-temporal-action detecting module, the explicit feature and the implicit feature of each temporal anchor box to obtain a comprehensive feature of each temporal anchor box.

This step is implemented by the feature acquiring unit in the video-temporal-action detecting module.

(b3) detecting each temporal anchor box based on the comprehensive feature thereof, and screening a target temporal anchor box containing the specified action, the category of the specified action and the probability that the specified action belongs to the category.

This step is implemented by the action classifier in the video-temporal-action detecting module.

(c3) detecting boundaries of the target temporal anchor box containing the specified action in the initial temporal feature sequence, and acquiring the starting position and the ending position of the video clip corresponding to the target temporal anchor box.

This step is implemented by the boundary regressor in the video-temporal-action detecting module.

Further, for example, in the step (c3), after the detecting boundaries of the target temporal anchor box containing the specified action in the initial temporal feature sequence, and before the acquiring the starting position and the ending position of the video clip corresponding to the target temporal anchor box, the method further includes: performing logistic regression analysis on the starting position and the ending position of the video clip corresponding to the target temporal anchor box in conjunction with a plurality of temporal features in the initial temporal feature sequence in front of and behind the boundaries of the target temporal anchor box.

That is, analysis is performed on the temporal features in front of and behind the boundaries of the target temporal anchor box, and if having quite high similarity to the feature of the target temporal anchor box, the temporal features may be considered to probably include the specified action contained in the target temporal anchor box, and at this point, these temporal features may also be integrated into the video clip containing the specified action, so as to adjust the starting position and the ending position of the video clip containing the specified action. This solution may also be set to be implemented in the boundary regressor.

Figure 4:
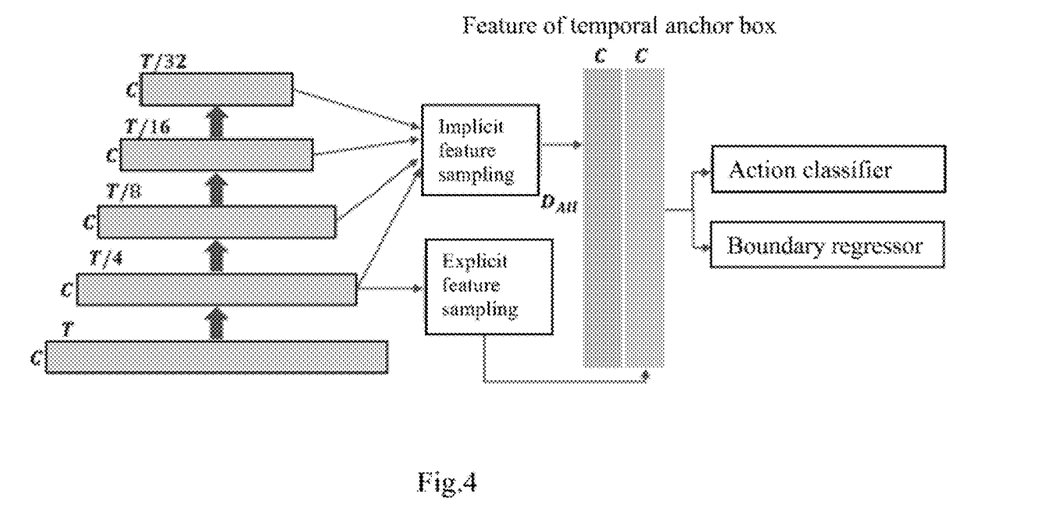
FIG. 4 is a diagram of a working principle of a video-temporal-action detecting module according to the present application.

For example, FIG. 4 is a diagram of a working principle of the video-temporal-action detecting module according to the present application. As shown in FIG. 4, first, image features are extracted at a certain interval (for example, 5 FPS) from a video to form a video feature sequence, for example, $F_0 \in R^{T \times C_0}$, which is then input into the video-temporal-action detecting module; in the video-temporal-action detecting module, a first temporal feature sequence $F_1 \in R^{T/4 \times C}$ is first generated by a basic convolutional module reducing the temporal length and enhancing a receptive field, and then, the temporal length is continuously reduced through a convolutional layer and a pooling layer to obtain $F_2 \in R^{T/8 \times C}$, $F_3 \in R^{T/16 \times C}$ and $F_4 \in R^{T/32 \times C}$. D temporal anchor boxes are associated with each temporal position on each temporal feature sequence, with a total of $$D_{all} = \left(\frac{1}{4} + \frac{1}{8} + \frac{1}{16} + \frac{1}{32}\right)T * D$$

temporal anchor boxes. Implicit features $M_I \in R^{C \times VD_{all}}$ of all the temporal anchor boxes may be obtained by means of the above-mentioned implicit-feature sampling process, and explicit features $M_E \in R^{C \times D_{all}}$ may also be obtained by means of the explicit-feature sampling process. Then, the implicit features and the explicit features are spliced to obtain complete features $M \in R^{2C \times D_{all}}$ of the temporal anchor boxes. Finally, the category of the specified action included in each temporal anchor box, the probability of belonging to the category and the boundary offset of the video clip are predicted based on the spliced feature of the temporal anchor box. For details, reference may be made to the description of the above-mentioned embodiment, and details are not repeated herein.

In addition, it should be noted that the training process of the video-temporal-action detecting module in this embodiment is substantially the same as the above-mentioned use process, and the only difference is annotation of the starting position and the ending position of the video clip including the specified action in each training video, the category of the contained specified action and the probability of belonging to the category in the training process, and in the training process, the probabilities are all 1. Thus, after predicted with the use process in the above-mentioned embodiment, the starting position and the ending position of the video clip including the specified action in each training video, the category of the contained specified action and the probability of belonging to the category are compared with the annotated results, and if the predicted results are different from the annotated results, all parameters required to be learned in the model are adjusted to enable the training results to be consistent with the annotated results. In this way, the video-temporal-action detecting module is continuously trained with a plurality of training samples until the predicted results are consistent with the annotated results, and at this point, values of all learnable parameters are determined to determine the video-temporal-action detecting module.

In the method for detecting a temporal action of a video according to this embodiment, the temporal action of the video is detected with the pre-trained video-temporal-action detecting module, thus avoiding the detection process being divided into two steps of temporal proposal generation and temporal proposal classification in the prior art, with a simple implementation process and an effective improvement of the detection efficiency of the temporal action of the video.

In addition, in this embodiment, by combining the explicit feature and the implicit feature of each temporal anchor box, action category information and the offset of the temporal boundary of each temporal anchor box are predicted more accurately, resulting in a better detection effect of the temporal action.

If prediction is performed only with the implicit features of the temporal anchor boxes, as shown in the above-mentioned embodiment, the features of the temporal positions adopted by the implicit features of the temporal anchor boxes only approximately but not accurately correspond to the information corresponding to the temporal anchor boxes, causing the video-temporal-action detecting module not to quite accurately classify the action and regress a temporal edge. Therefore, in this embodiment, the explicit features of the temporal anchor boxes are configured efficiently and accurately, and the temporal action is detected by combining the explicit feature and the implicit feature of each temporal anchor box, thus further improving the detection accuracy of the temporal action.

Figure 5:
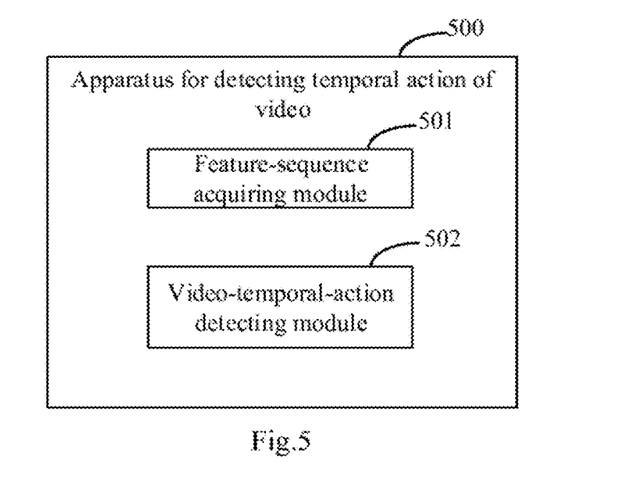
FIG. 5 is a schematic diagram according to a second embodiment of the present application.

FIG. 5 shows a structural diagram of an apparatus for detecting a temporal action of a video according to a second embodiment of the present application. As shown in FIG. 5, the apparatus for detecting a temporal action of a video according to this embodiment includes: a feature-sequence acquiring module 501 configured to acquire an initial temporal feature sequence of a video to be detected; and a pre-trained video-temporal-action detecting module 502 configured to acquire implicit features and explicit features of a plurality of configured temporal anchor boxes based on the initial temporal feature sequence; wherein the video-temporal-action detecting module 502 is further configured to acquire the starting position and the ending position of a video clip containing a specified action, the category of the specified action and the probability that the specified action belongs to the category from the plural temporal anchor boxes according to the explicit features and the implicit features of the plural temporal anchor boxes.

Further optionally, the feature-sequence acquiring module 501 is configured to: successively extract a plurality of images from the video to be detected in an extraction order from front to back at a preset sampling period, so as to form an image sequence; and extract a feature of each image in the image sequence, and splice the features into the initial temporal feature sequence in the order in the image sequence.

Further optionally, the video-temporal-action detecting module 502 is configured to: reduce the temporal length of the initial temporal feature sequence according to a plurality of preset temporal length reduction ways, so as to obtain a plurality of adjusted reference temporal feature sequences: configure a plurality of temporal anchor boxes with a preset number and different scales for the temporal positions of each reference temporal feature sequence; and configure the implicit feature of each temporal anchor box as the feature of the corresponding temporal position in the corresponding reference temporal feature sequence.

Further optionally, the video-temporal-action detecting module 502 is configured to: take the reference temporal feature sequence with the longest length in the plural reference temporal feature sequences as a sample, and acquire the explicit feature of each temporal anchor box by multiplying the sample by a sampling feature constructed for each temporal anchor box.

Further optionally, the video-temporal-action detecting module 502 is configured to: splice the explicit feature and the implicit feature of each temporal anchor box to obtain a comprehensive feature of each temporal anchor box; detect each temporal anchor box based on the comprehensive feature thereof, and screen a target temporal anchor box containing the specified action, the category of the specified action and the probability that the specified action belongs to the category; and detect boundaries of the target temporal anchor box containing the specified action in the initial temporal feature sequence, and acquire the starting position and the ending position of the video clip corresponding to the target temporal anchor box.

Further optionally, the video-temporal-action detecting module 502 is configured to: perform logistic regression analysis on the starting position and the ending position of the video clip corresponding to the target temporal anchor box in conjunction with a plurality of temporal features in the initial temporal feature sequence in front of and behind the boundaries of the target temporal anchor box.

The apparatus 500 for detecting a temporal action of a video according to this embodiment has the same implementation as the above-mentioned relevant method embodiment by adopting the above-mentioned modules to implement the implementation principle and the technical effects of detection of a temporal action of a video in this embodiment, and for details, reference may be made to the description of the above-mentioned relevant method embodiment, and details are not repeated herein.

According to the embodiment of the present application, there are also provided an electronic device and a readable storage medium.

Figure 6:
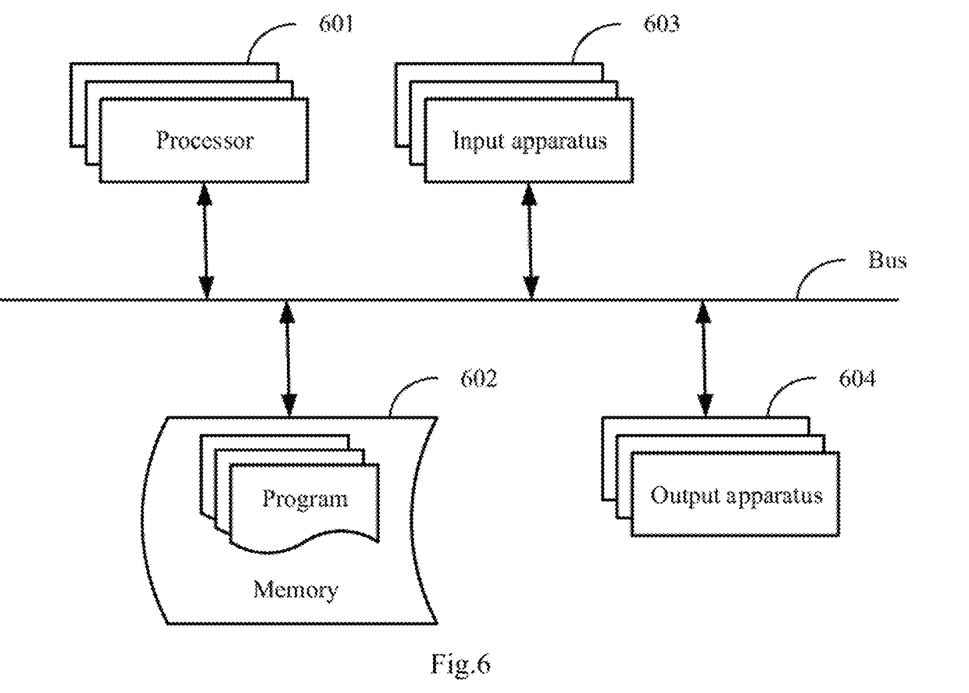
FIG. 6 is a block diagram of an electronic device configured to implement a method for detecting a temporal action of a video according to the embodiment of the present application.

FIG. 6 is a block diagram of an electronic device configured to implement a method for detecting a temporal action of a video according to the embodiment of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 6, the electronic device includes one or more processors 601, a memory 602, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 6, one processor 601 is taken as an example.

The memory 602 is configured as the non-transitory computer readable storage medium according to the present application. The memory stores instructions executable by the at least one processor to cause the at least one processor to perform a method for detecting a temporal action of a video according to the present application. The non-transitory computer readable storage medium according to the present application stores computer instructions for causing a computer to perform the method for detecting a temporal action of a video according to the present application.

The memory 602 which is a non-transitory computer readable storage medium may be configured to store non-transitory software programs, non-transitory computer executable programs and modules, such as program instructions/modules corresponding to the method for detecting a temporal action of a video according to the embodiment of the present application (for example, the relevant modules shown in FIG. 5). The processor 601 executes various functional applications and data processing of a server, that is, implements the method for detecting a temporal action of a video according to the above-mentioned embodiment, by running the non-transitory software programs, instructions, and modules stored in the memory 602.

The memory 602 may include a program storage area and a data storage area, wherein the program storage area may store an operating system and an application program required for at least one function; the data storage area may store data created according to use of the electronic device for implementing the method for detecting a temporal action of a video, or the like. Furthermore, the memory 602 may include a high-speed random access memory, or a non-transitory memory, such as at least one magnetic disk storage device, a flash memory device, or other non-transitory solid state storage devices. In some embodiments, optionally, the memory 602 may include memories remote from the processor 601, and such remote memories may be connected to the electronic device for implementing the method for detecting a temporal action of a video. Examples of such a network include, but are not limited to, the Internet, intranets, local area networks, mobile communication networks, and combinations thereof.

The electronic device for implementing the method for detecting a temporal action of a video may further include an input apparatus 603 and an output apparatus 604. The processor 601, the memory 602, the input apparatus 603 and the output apparatus 604 may be connected by a bus or other means, and FIG. 6 takes the connection by a bus as an example.

The input apparatus 603 may receive input numeric or character information and generate key signal input related to user settings and function control of the electronic device for implementing the method for detecting a temporal action of a video, such as a touch screen, a keypad, a mouse, a track pad, a touch pad, a pointing stick, one or more mouse buttons, a trackball, a joystick, or the like. The output apparatus 604 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user, and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

According to the technical solution of the embodiment of the present application, the temporal action of the video is detected with the pre-trained video-temporal-action detecting module, thus avoiding the detection process being divided into two steps of temporal proposal generation and temporal proposal classification in the prior art, with a simple implementation process and an effective improvement of the detection efficiency of the temporal action of the video.

Moreover, according to the technical solution of the embodiment of the present application, the explicit features of the temporal anchor boxes are configured efficiently and accurately, and the temporal action is detected by combining the explicit feature and the implicit feature of each temporal anchor box, thus further improving the detection accuracy of the temporal action.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for detecting a temporal action of a video, comprising:

successively extracting a plurality of images from the video to be detected in an extraction order from front to back at a preset sampling period, so as to form an image sequence, and extracting a feature of each image in the image sequence, and splicing the features into the initial temporal feature sequence in the order in the image sequence;

reducing, by a pre-trained video-temporal-action detecting module, the temporal length of the initial temporal feature sequence according to a plurality of preset temporal length reduction ways, so as to obtain a plurality of adjusted reference temporal feature sequences, configuring a plurality of temporal anchor boxes with a preset number and different scales for temporal positions of each reference temporal feature sequence, wherein the preset temporal length reduction ways comprises four reference temporal feature sequences with different temporal lengths T/4, T/8, T/16 and T/32 if the initial temporal feature sequence has a length T, configuring the implicit feature of each temporal anchor box as the feature of the corresponding temporal position in the corresponding reference temporal feature sequence, and taking the reference temporal feature sequence with the longest length in the plural reference temporal feature sequences as a sample, and acquiring the explicit feature of each temporal anchor box by multiplying the sample by a sampling feature constructed for each temporal anchor box in the form of a vector; and splicing, by the video-temporal-action detecting module, the explicit feature and the implicit feature of each temporal anchor box to obtain a comprehensive feature of each temporal anchor box;

detecting each temporal anchor box based on the comprehensive feature thereof, and screening a target temporal anchor box containing the specified action, the category of the specified action and the probability that the specified action belongs to the category; and detecting boundaries of the target temporal anchor box containing the specified action in the initial temporal feature sequence, and acquiring the starting position and the ending position of the video clip corresponding to the target temporal anchor box.

2. The method according to claim 1, wherein after the detecting boundaries of the target temporal anchor box containing the specified action in the initial temporal feature sequence, and before the acquiring the starting position and the ending position of the video clip corresponding to the target temporal anchor box, the method further comprises:

performing logistic regression analysis on the starting position and the ending position of the video clip corresponding to the target temporal anchor box in conjunction with a plurality of temporal features in the initial temporal feature sequence in front of and behind the boundaries of the target temporal anchor box.

3. An electronic device, comprising:
at least one processor; and
a memory communicatively connected with the at least one processor;

wherein the memory stores instructions executable by the at least one processor, and the instructions are executed by the at least one processor to enable the at least one processor to perform a method for detecting a temporal action of a video, wherein the method comprises:

successively extracting a plurality of images from the video to be detected in an extraction order from front to back at a preset sampling period, so as to form an image sequence, and extracting a feature of each image in the image sequence, and splicing the features into the initial temporal feature sequence in the order in the image sequence;

reducing, by a pre-trained video-temporal-action detecting module, the temporal length of the initial temporal feature sequence according to a plurality of preset temporal length reduction ways, so as to obtain a plurality of adjusted reference temporal feature sequences, configuring a plurality of temporal anchor boxes with a preset number and different scales for temporal positions of each reference temporal feature sequence, wherein the preset temporal length reduction ways comprises four reference temporal feature sequences with different temporal lengths T/4, T/8, T/16 and T/32 if the initial temporal feature sequence has a length T, configuring the implicit feature of each temporal anchor box as the feature of the corresponding temporal position in the corresponding reference temporal feature sequence, and taking the reference temporal feature sequence with the longest length in the plural reference temporal feature sequences as a sample, and acquiring the explicit feature of each temporal anchor box by multiplying the sample by a sampling feature constructed for each temporal anchor box in the form of a vector; and splicing the explicit feature and the implicit feature of each temporal anchor box to obtain a comprehensive feature of each temporal anchor box;

detecting each temporal anchor box based on the comprehensive feature thereof, and screening a target temporal anchor box containing the specified action, the category of the specified action and the probability that the specified action belongs to the category; and detecting boundaries of the target temporal anchor box containing the specified action in the initial temporal feature sequence, and acquiring the starting position and the ending position of the video clip corresponding to the target temporal anchor box.

4. The electronic device according to claim 3, wherein after the detecting boundaries of the target temporal anchor box containing the specified action in the initial temporal feature sequence, and before the acquiring the starting position and the ending position of the video clip corresponding to the target temporal anchor box, the method further comprises:

performing logistic regression analysis on the starting position and the ending position of the video clip corresponding to the target temporal anchor box in conjunction with a plurality of temporal features in the initial temporal feature sequence in front of and behind the boundaries of the target temporal anchor box.

5. A non-transitory computer readable storage medium with computer instructions stored thereon, wherein the computer instructions are used for causing a computer to perform a method for detecting a temporal action of a video, comprising:

successively extracting a plurality of images from the video to be detected in an extraction order from front to back at a preset sampling period, so as to form an image sequence, and extracting a feature of each image in the image sequence, and splicing the features into the initial temporal feature sequence in the order in the image sequence;

reducing, by a pre-trained video-temporal-action detecting module, the temporal length of the initial temporal feature sequence according to a plurality of preset temporal length reduction ways, so as to obtain a plurality of adjusted reference temporal feature sequences, configuring a plurality of temporal anchor boxes with a preset number and different scales for temporal positions of each reference temporal feature sequence, wherein the preset temporal length reduction ways comprises four reference temporal feature sequences with different temporal lengths T/4, T/8, T/16 and T/32 if the initial temporal feature sequence has a length T, configuring the implicit feature of each temporal anchor box as the feature of the corresponding temporal position in the corresponding reference temporal feature sequence, and taking the reference temporal feature sequence with the longest length in the plural reference temporal feature sequences as a sample, and acquiring the explicit feature of each temporal anchor box by multiplying the sample by a sampling feature constructed for each temporal anchor box in the form of a vector; and splicing, by the video-temporal-action detecting module, the explicit feature and the implicit feature of each temporal anchor box to obtain a comprehensive feature of each temporal anchor box;

detecting each temporal anchor box based on the comprehensive feature thereof, and screening a target temporal anchor box containing the specified action, the category of the specified action and the probability that the specified action belongs to the category; and detecting boundaries of the target temporal anchor box containing the specified action in the initial temporal feature sequence, and acquiring the starting position and the ending position of the video clip corresponding to the target temporal anchor box.

6. The non-transitory computer readable storage medium according to claim 5, wherein after the detecting boundaries of the target temporal anchor box containing the specified action in the initial temporal feature sequence, and before the acquiring the starting position and the ending position of the video clip corresponding to the target temporal anchor box, the method further comprises:

performing logistic regression analysis on the starting position and the ending position of the video clip corresponding to the target temporal anchor box in conjunction with a plurality of temporal features in the initial temporal feature sequence in front of and behind the boundaries of the target temporal anchor box.

* * * * *